(12) United States Patent
Barnett et al.

(10) Patent No.: US 10,685,256 B2
(45) Date of Patent: *Jun. 16, 2020

(54) OBJECT RECOGNITION STATE INDICATORS

(71) Applicant: Google LLC, Mountain View, CA (US)

(72) Inventors: Don Barnett, Monroe, WA (US); John DiMartile, Seattle, WA (US); Alison Lentz, Seattle, WA (US); Rachel Lara Been, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,224

(22) Filed: Apr. 17, 2019

(65) Prior Publication Data

US 2019/0244057 A1 Aug. 8, 2019

Related U.S. Application Data

(63) Continuation of application No. 15/664,913, filed on Jul. 31, 2017, now Pat. No. 10,289,932.

(51) Int. Cl.
*G06K 9/62* (2006.01)
*G06K 9/00* (2006.01)
(Continued)

(52) U.S. Cl.
CPC ....... *G06K 9/6215* (2013.01); *G06K 9/00671* (2013.01); *G06K 9/2081* (2013.01);
(Continued)

(58) Field of Classification Search
USPC .................................................. 382/103, 305
See application file for complete search history.

(56) References Cited

U.S. PATENT DOCUMENTS 6,999,623 B1 2/2006 Yannaoka
8,194,986 B2 6/2012 Conwell
(Continued)

OTHER PUBLICATIONS

Castagno et al. "Video Segmentation Based on Multiple Features for Interactive Multimedia Applications," IEEE Transaction on Circuits and Systems for Video Technology, vol. 8(5), Sep. 1, 1998, 10 pages.

(Continued)

*Primary Examiner* — Ishrat I Sherali
(74) *Attorney, Agent, or Firm* — Dority & Manning, P.A.

(57) ABSTRACT

Methods and systems including computer programs encoded on a computer storage medium, for generating and displaying object recognition state indicators during object recognition processing of an image. In one aspect, a method includes performing object recognition on an image displayed in an application environment of an application on a user device using an object recognition model having multiple object recognition states including an identification state, where a candidate object in the image is positively identified, and one or more precursor states to the identification state, and where each of the precursor states has a different respective indicator for display within the image during the respective precursor state that visually emphasizes the candidate object and the identification state has a different respective indicator for display within the image during the identification state that visually emphasizes the positively identified object as being positively identified.

13 Claims, 8 Drawing Sheets

(51) Int. Cl.
  *G06K 9/20* (2006.01)
  *G06K 9/32* (2006.01)
  *G06K 9/36* (2006.01)
  *G06F 16/532* (2019.01)

(52) U.S. Cl.
  CPC ......... *G06K 9/3241* (2013.01); *G06K 9/6202* (2013.01); *G06F 16/532* (2019.01); *G06K 2009/366* (2013.01)

(56) References Cited

U.S. PATENT DOCUMENTS

| | | |
|---|---|---|
| 8,630,513 B2 | 1/2014 | Gokturk |
| 8,768,048 B1 | 7/2014 | Kwatra |
| 8,831,279 B2 | 9/2014 | Rodriguez |
| 8,849,050 B2 | 9/2014 | Wang |
| 8,953,895 B2 | 2/2015 | Kawanishi |
| 9,483,701 B1 | 11/2016 | Kwatra |
| 9,495,748 B2 | 11/2016 | Mullins |
| 9,865,062 B2 | 1/2018 | Sundaresan |
| 9,886,621 B2 | 2/2018 | Gordon |
| 10,289,932 B2 * | 5/2019 | Barnett ............... G06K 9/6215 |
| 2003/0035479 A1 | 2/2003 | Kan |
| 2019/0272425 A1 * | 9/2019 | Tang ................... G06F 16/532 |

OTHER PUBLICATIONS

Dorf. "Circuits Signals and Speech and Image Processing, 3$^{rd}$ ed," Jan. 1, 2006, 1 page.
Fink et al. "Markov models for Pattern Recognition," Markov models for pattern recognition, Springer, Jan. 1, 2008, pp. 3, 61-93 (34 pages total).
Jitao Sang et al. "Interaction Design for Mobile Visual Search," IEEE Transactions on Multimedia, vol. 15(7) Nov. 1, 2013, 12 pages.
Le Dong et al. "E-GrabCut: an economic extraction method of iterative video object extraction," Frontiers of Computer Science, Springer, vol. 11(4) Apr. 29, 2017, 12 pages.
PCT International Search Report and Written Opinion issued in International Application No. PCT/US2018/027301, dated Aug. 30, 2018, 19 pages.
PCT International Preliminary Report on Patentability in International Application No. PCT/US2018/027301, dated Feb. 4, 2020, 13 pages.
The YouTube Tech Guy, "Galaxy S8 Bixby Vision Walkthrough", Mar. 29, 2017 , youtube.com/watch?v=1rNTAqlpS_8.

* cited by examiner

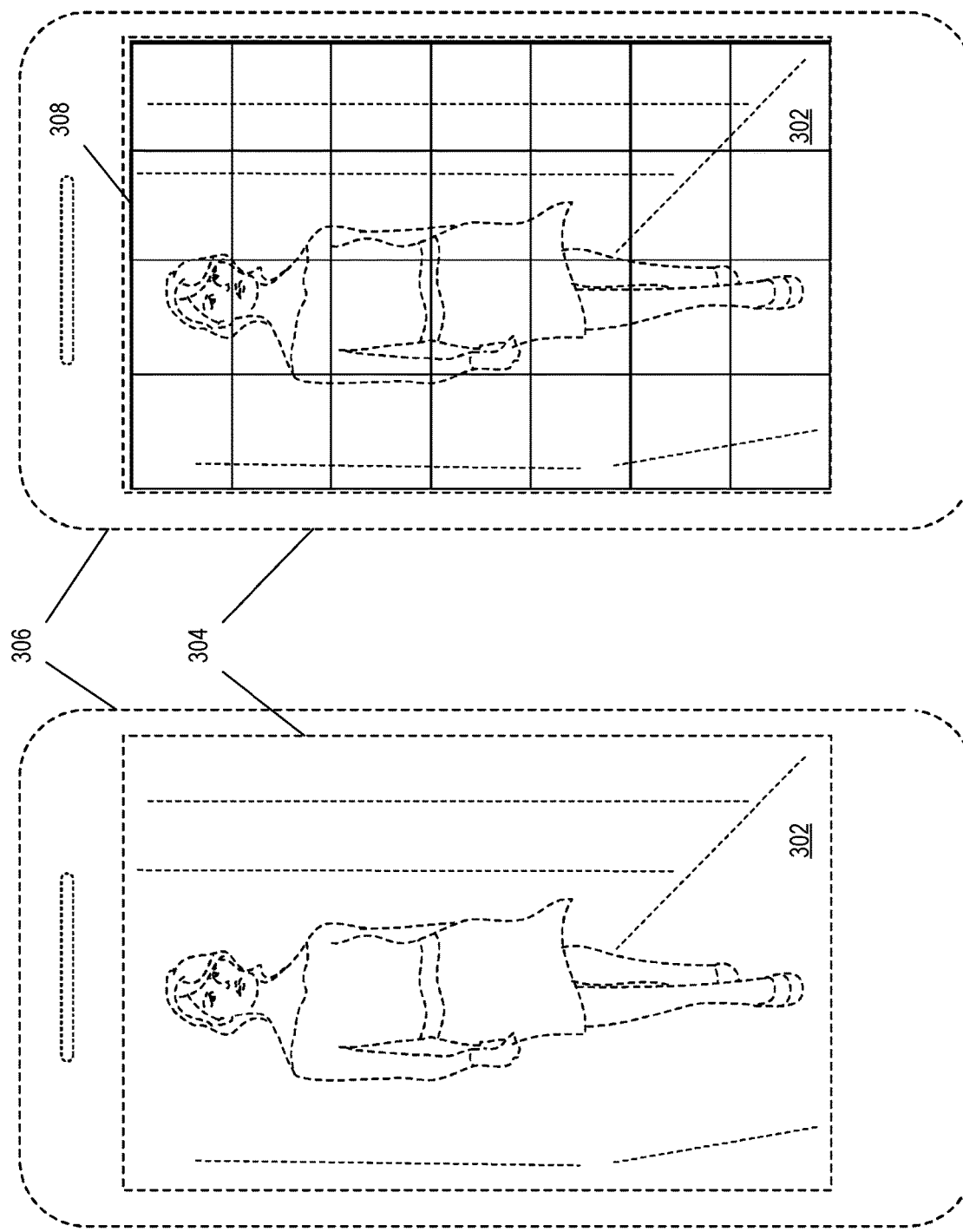

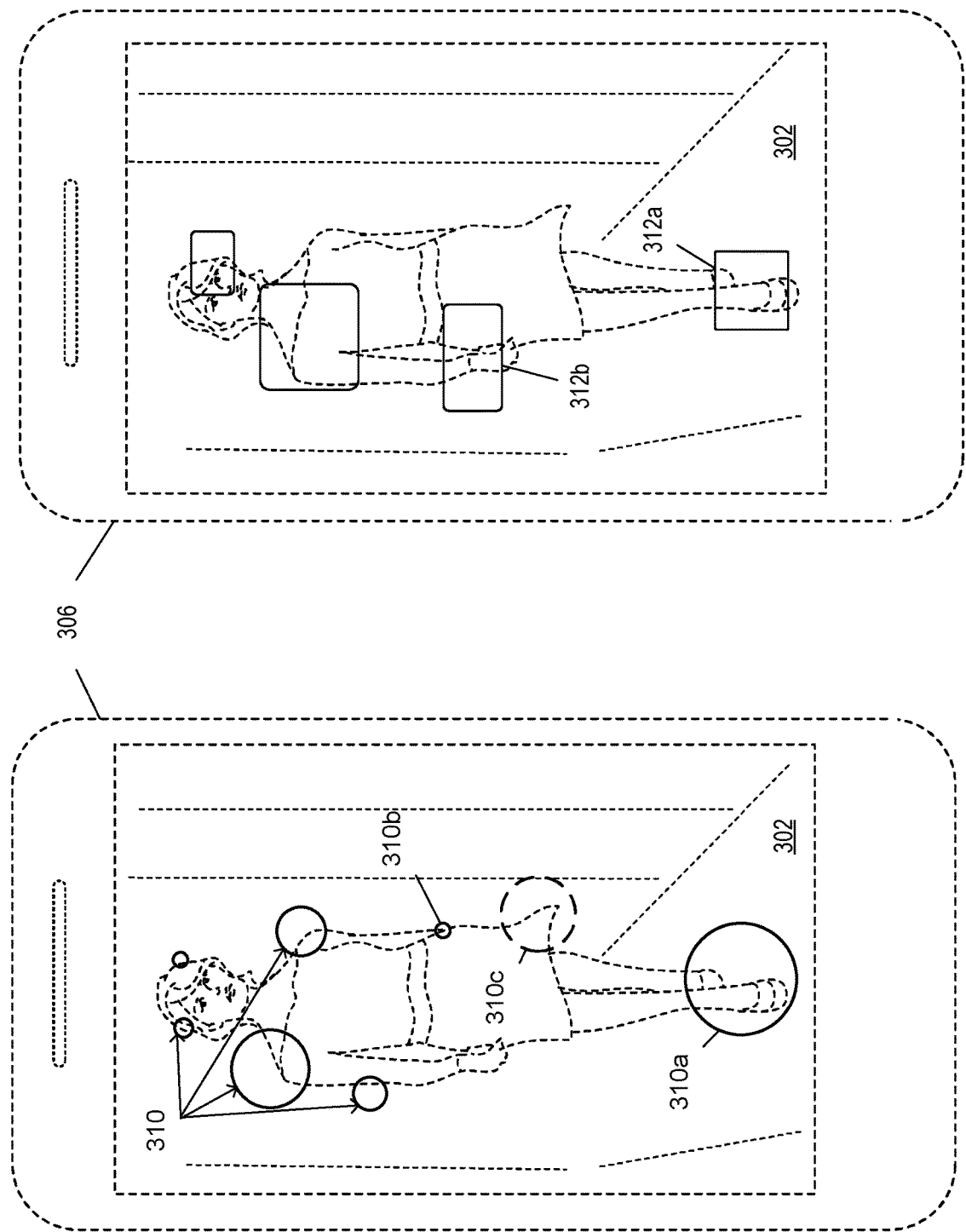

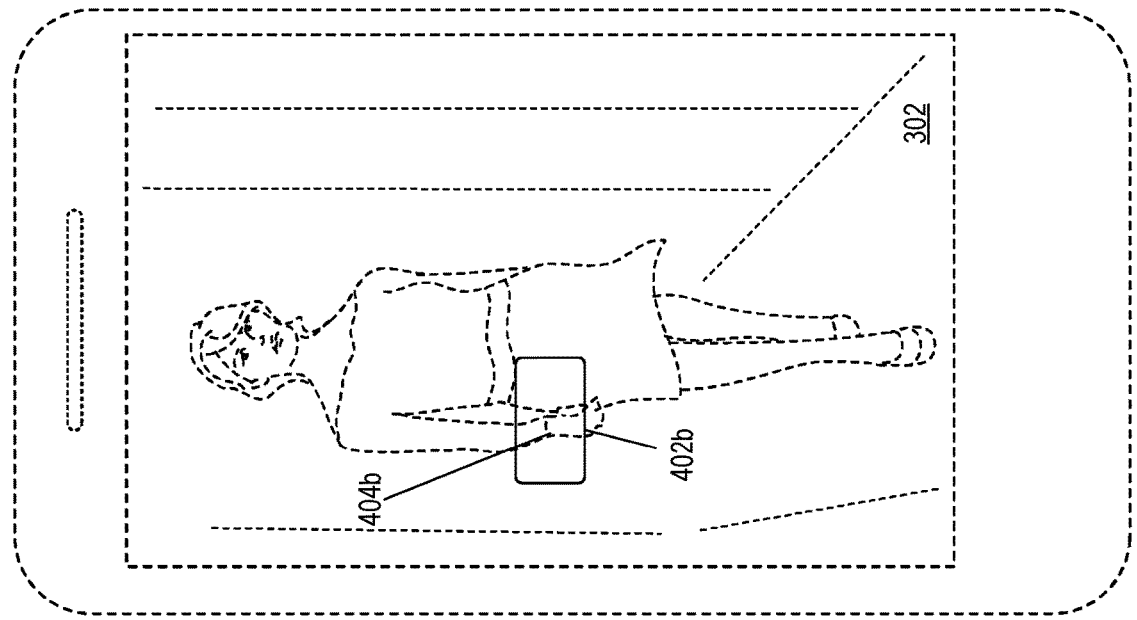
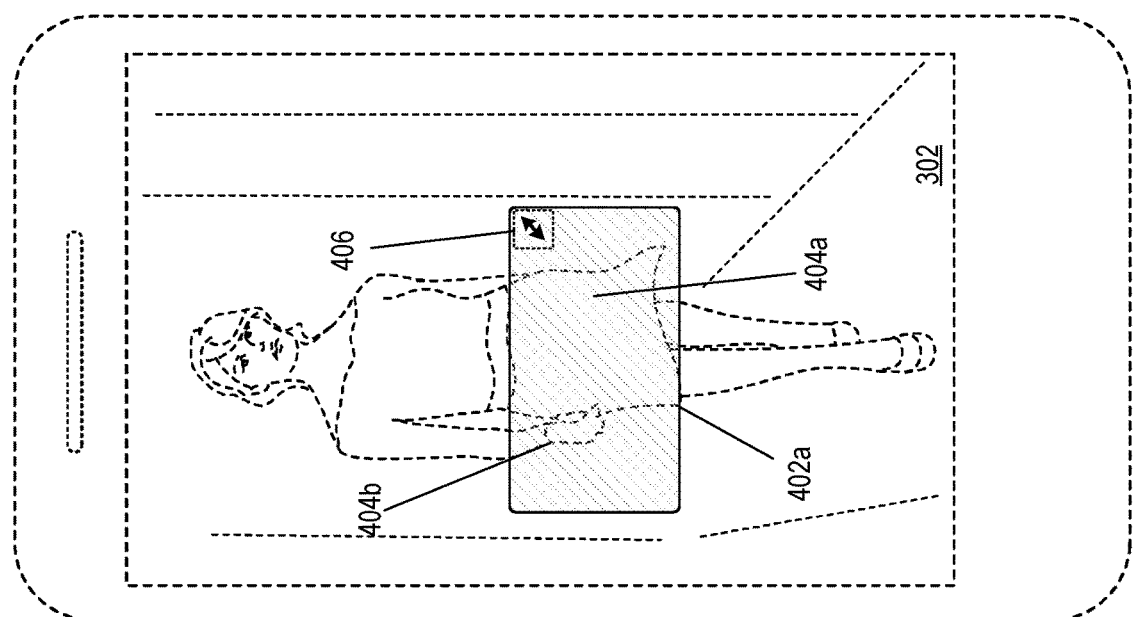
FIG. 4B
FIG. 4A

OBJECT RECOGNITION STATE INDICATORS

CROSS-REFERENCE TO RELATED APPLICATIONS

This application is a continuation application of, and claims priority to, U.S. patent application Ser. No. 15/664,913, titled "OBJECT RECOGNITION STATE INDICATORS," filed on Jul. 31, 2017. The disclosure of the foregoing application is incorporated herein by reference in its entirety for all purposes.

BACKGROUND

Object recognition software is used to detect and identify objects in an image or video sequence. Processes for object recognition of an image or video sequence often employ various distinct steps for analyzing an image to positively identify an object within the image.

Once a user has selected an image in which to look for objects of interest, the object recognition software running in the background of a user device and/or on a server will operate without user feedback during the process of identifying objects within the image. Oftentimes a lack of user feedback during the object recognition software leads to imperfect object recognition including incorrect identification, no positive identification, or an undesired object being identified within the image or video sequence. However, without direct visual indicators of the process of object recognition displayed within the candidate image on a user device, the user have little understanding of the object recognition process and cannot give important feedback to assist in the object recognition process.

SUMMARY

This specification describes technologies relating to representing an object recognition process in real-time using object recognition state indicators to a user viewing the image on a user device.

In general, one innovative aspect of the subject matter described in this specification can be embodied in methods that include the actions of providing an image for display in an application environment of an application executing on a user device, performing object recognition on the image by use of an object recognition model that has multiple object recognition states, where at least one object recognition state is an identification state that is achieved when a candidate object detected in the image is positively identified by the model as an object in the image, and at least one or more states that are precursor states to the identification state. Performing object recognition includes generating, for each precursor state, a respective precursor state indicator for the precursor state for display within in the image that visually emphasizes the candidate object depicted in the image, where the respective precursor state indicator for each precursor state is visually different from the respective precursor state indicator for each other precursor state. Performing object recognition also includes generating, for the identification state, an identification state indicator for display within the image that is visually different from each respective precursor state indicator and that visually emphasizes that the candidate object is the object that is positively identified in the image. Data is provided to the application executing on the user device that causes each of the precursor state indicators to be displayed within the image in the application environment to visually emphasize the candidate object and to indicate the respective precursor state of the object recognition model and the identification state indicator to be displayed within the image to visually emphasize the candidate object as being positively identified and to indicate the identification state of the object recognition model. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Providing real-time visual cues representing object recognition states of an object recognition model to a user on a user device displaying an image of interest allows the user to provide feedback and assist in the object recognition process. Presenting visual cues for intermediary steps in the object recognition process to a user can help to identify potential problems in the object recognition process during one or more of the steps. Moreover, should the object recognition process fail to identify an object, the use of visual cues can help the user understand at which point the object recognition process is failing. This reduces or eliminates the need for instrumenting an object recognition process to provide, for example, data logging describing pass events and fail events during the process. Accordingly, the technological fields of object recognition processing and process troubleshooting are improved.

Moreover, a user can provide disambiguation commands to the object recognition process (e.g., identify particular regions of interest within the image for the system to focus the object recognition process) and provide feedback to ignore undesirable objects identified by the object recognition process.

Additionally, providing visual cues about image quality may assist a user in selecting a second image if a first image is determined to be unsuitable (e.g., too dark or blurred pixels) for the object recognition process. The visual cues selected to represent the steps of an object recognition process may be built around a human-computer interaction model to provide an improved intuitive user experience. Moreover, introducing latency into the object recognition process may allow a user to more easily visually understand a process that otherwise may occur too quickly for user comprehension.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3F are illustrations of example visual indicators that are displayed during object recognition states.

FIGS. 4A-4C are illustrate state indicators that are manipulated to provide feedback during the object recognition process.

Like reference numbers and designations in the various drawings indicate like elements.

DETAILED DESCRIPTION

Overview

Described below are systems and methods for performing object detection on an image provided for display in an application environment on a user device, using an object recognition model that has multiple object detection states. At least one of the object detection states is an identification state which is achieved when a candidate object is positively detected and identified in the image by the object recognition model. The object detection states also include multiple precursor states that precede the recognition state, for example, a "searching" state, and a "seeing" state. Additionally, a "loading" state may precede the "searching" state of the object recognition model where the image is being loaded into the object recognition model.

Each of the precursor states and the identification state has a unique state indicator that visually emphasizes the candidate object in the image. For example, the unique state indicator can be a visual cue such as a circle outline, a rounded-corner rectangle outline, or a rectangle outline surrounding the candidate object.

Each of the precursor state indicators and the identification state indicator are displayed within the image in the application environment to visually emphasize the candidate object during the respective object detection state of the object recognition model.

These features and additional features are described in more detail below.

Example Operating Environment

Figure 1:
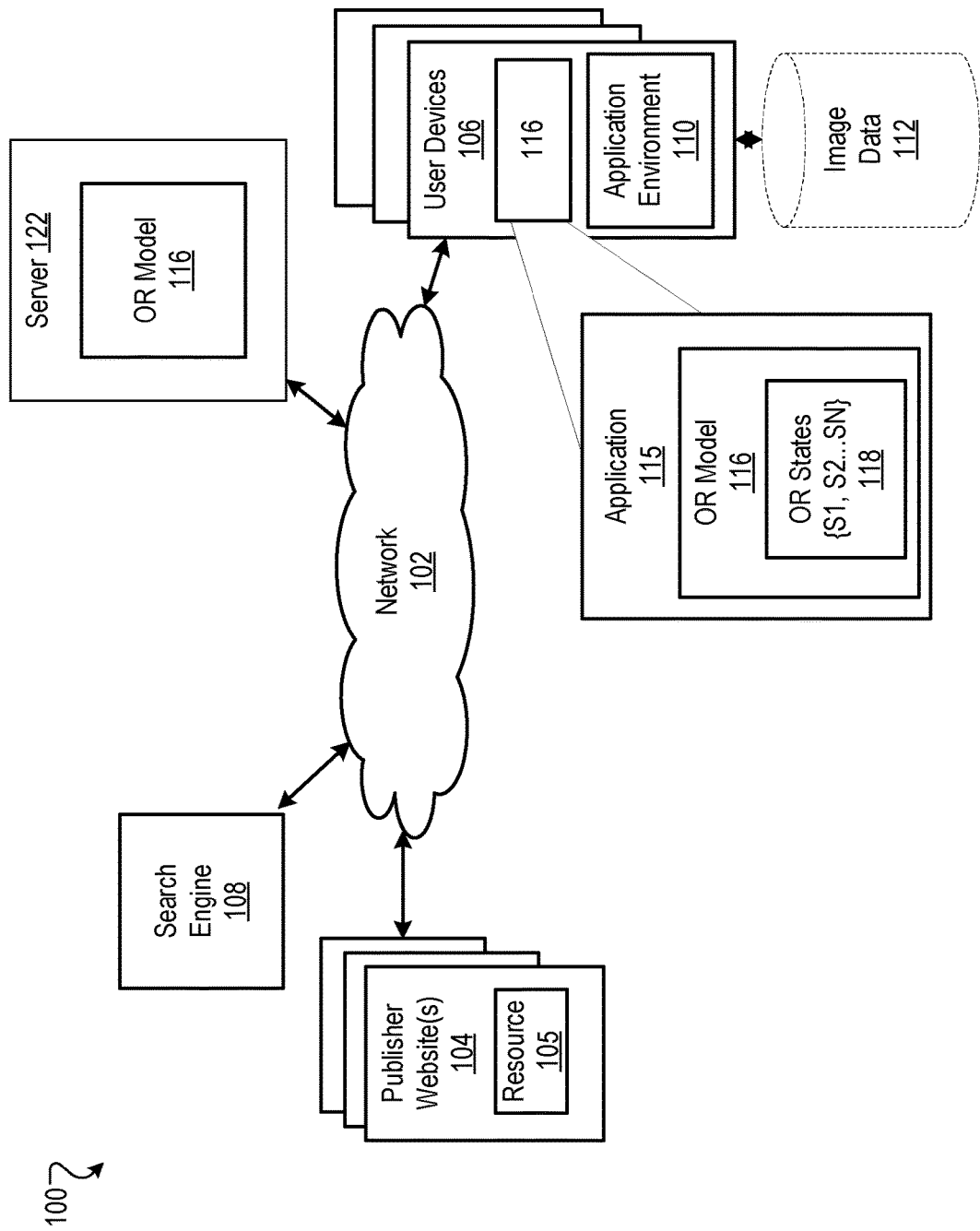
FIG. 1 is a block diagram of an example environment in which an object recognition process may occur of an image displayed on a user device.

FIG. 1 is a block diagram of an example environment 100 in which an object recognition process is performed on an image displayed in an application environment on a user device. A computer network 102, such as a local area network (LAN), wide area network (WAN), the Internet, or a combination thereof, connects publisher websites 104, user devices 106, and the search engine 108. The online environment 100 may include many thousands of publisher websites 104 and user devices 106.

A publisher website 104 includes one or more resources 105 associated with a domain name and hosted by one or more servers. An example website is a collection of web pages formatted in hypertext markup language (HTML) that can contain text, images, multimedia content, and programming elements, such as scripts. Each publisher web site 104 is maintained by a content publisher, which is an entity that controls, manages and/or owns the website 104.

A resource 105 is any data that can be provided by the publisher website 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

The user device 106 can also run a variety of applications. An application on a user device 106 can include an application environment, e.g., a graphical user interface (GUI) 110, in which images may be shown. Examples of such applications are camera-enable applications that can use an on-device camera to capture an image, applications that can receive images from publishers 104 over the network 102 and display the images, and applications that can access and display images that are stored on the user device 106. For example, an application may have access to a repository of image data 112 stored on the user device 106, where the application environment 110 can load an image from the image data 112.

The user device 106 also includes an application 115 that performs an object recognition on an image within the application environment 110 on the user device 106. The object recognition is performed using an object recognition model 116 that may access the displayed image data by means of an Application Programing Interface (API). Object recognition process may be used to recognize text, landmarks, animals, objects of the natural world, people, items, etc., within an image displayed on the user device 106.

The object recognition model 116 can be executed on the user device 106. The object recognition model 116 is, for example, a set of rules and processing algorithms for processing image data to positively identify objects depicted within an image. The object recognition model 116 may have multiple object recognition states 118 {S1, S2, ... SN}. For example, object recognition states can include a "loading" state, a "searching" state, a "seeing" state, and a "recognizing" state, where each object recognition state 118 corresponds to a different processing state of the object recognition model 116.

In some implementations, the object recognition is performed on the user device 106, and the user device 106 stores the model. In other implementations, the object recognition 116 is performed by a server 122 in data communication with the user device 106. The server 122 receives the image from the user device 106, processes the image at the server 122 using an object recognition model 116, and then provides the results of the object recognition model 116 to the user device 106 over the network.

Object Recognition Process

Figure 2A:
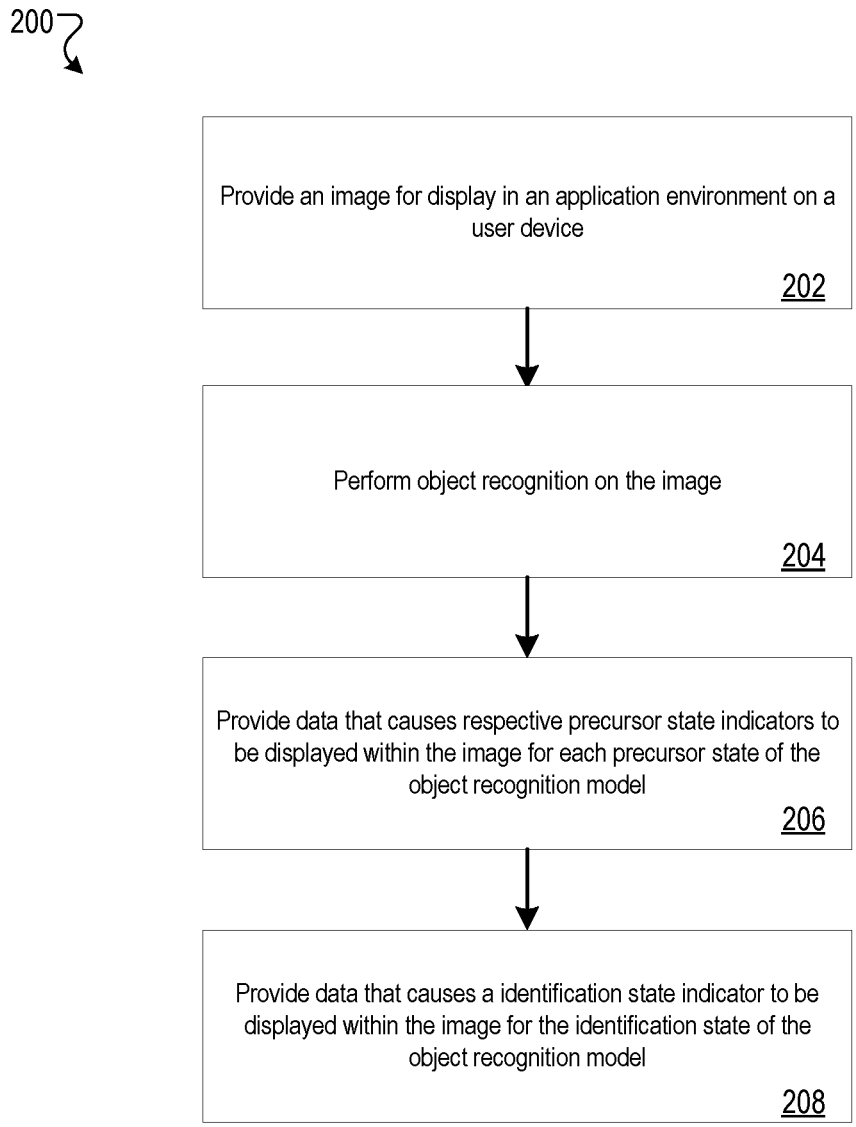
FIGS. 2A-2B are flow diagrams of an example process for object recognition of an image displayed on a user device.
Figure 2B:
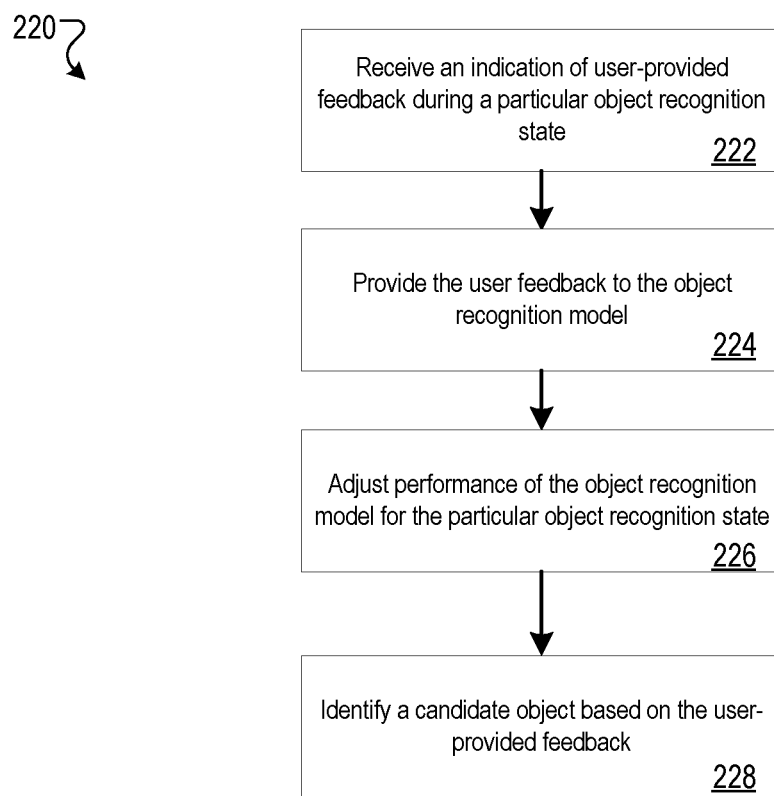

FIGS. 2A-2B are flow diagrams of example processes 200 for object recognition of an image displayed on a user device. The process 200 may be performed locally on a user device 106 or on a server 112 in communication with network 102.

An image is provided for display in an application environment 110 of an application on a user device 106 (202). The image may be locally stored on the user device 106 in a repository of image data 112, for example, in a photo application on a phone. The image may also be stored on a user's cloud service (e.g., Google Photos, or a cloud-based image application. The image may also be a "live" image, where the image is composed of pixel data received through a camera in an active viewport of a camera application environment 110 on a user device 106, without capturing and saving the image locally or on a cloud-based storage.

In some implementations, the image is provided in data by a publisher web site 104 of a resource 105 over network 102, for example, as an image displayed on a Website. A user on the user device 106 may perform a search query through a search engine 108 to request a resource 105 including an image or video sequence.

The image is displayed in the application environment 110 on the user device 106. Object recognition on the image is performed by use of an object recognition model 116 (204). For example, the user device may execute the object recognition model 116 on a displayed image to perform object recognition.

The object recognition model 116 has multiple object recognition states 118 {S1, S2, . . . SN}. The object recognition states 118 includes an identification state of the object recognition model where an object is positively identified within the image, and at least one precursor state of the object recognition model that precedes the identification state. Precursor states are achieved during the various processing stages of candidate objects. A candidate object is any set of data in the image that the object recognition model 116 may detect as a possible object but has not positively identified as an object. Candidate objects may be discarded during a precursor state. An indicator for the precursor state visually emphasizes the candidate object depicted in the image. The number and types of precursor states may depend on the particular object recognition model 116 that is used. Examples of precursor states of the object recognition states 118 can include, a "searching" state, and a "seeing" state. Examples of the object recognition states 118 are discussed in further details with reference to FIGS. 3A-3F.

Another object recognition state is a "loading" state. A loading state indicator indicates data for the image is being loaded into the process of the object recognition model 116. The loading state precedes the precursor states, and loading state indictor does not necessarily focus on a particular candidate object because the image is being loaded into the object recognition model 116 for processing. Thus, a loading state indicator, in one implementation, covers the entire image.

Each of the object recognition states 118 represents a state of the object recognition model 116. For example, a "loading" state is a state during which the executing object recognition model 116 may be loading the pixels of the image into a readable format for the object recognition model 116.

In another example, a "searching" state is a precursor state during which the object recognition model 116 may be searching the pixels of the image and determining edges or patterns of candidate objects within the image. Additionally, a "seeing" state may be a precursor state during which the object recognition model 116 is attempting to positively identify the one or more candidate objects within the image detected during the searching state.

In some implementations, other precursor states of the object recognition states 118 previously discussed can be implemented. For example, a precursor state is a "preliminary identification" state during which the object recognition model 116 has positively identified a candidate object as a generic object (e.g., a shoe, a plant, a bird), and which precedes an "identification" state in which the specific object is positively identified (e.g., a brand-name shoe, an aloe plant, a cardinal bird).

The application 115, which invokes the object recognition model 116, may receive from the object recognition model 116 data that indicates the current state of the object recognition model 116 and regions of interest within the image for that state. For example, the object recognition model 116 may include instructions that generate data that describes the particular model state and coordinates that describe the region of interest(s) for the state. The region may be the entire image, such as when the image is loading, or may be sub-portions of the image, such as when candidate objects are being detected.

The application 115 processes the data received from the object recognition model 116. For each of the object recognition states 118, including the identification state and the precursor states, the application 115 generates a distinct visual indicator that is displayed within the image and surrounding part or all of one or more objects of interest within the image. Each respective precursor state indicator for each precursor state is visually different from the respective precursor state indicator for each other precursor state. The processing and displaying of the indicators by the application 115 is concurrent with the processing of the image by the object recognition model 116.

Data is provided to the application 115 for each precursor state of the object recognition model 116 that causes the application to generate a respective precursor state indicator to be displayed within the image (206). The precursor state indicators may be configured to visually emphasize the candidate objects within the image. The precursor state indicators may surround a portion or all of the candidate object. In some implementations, the precursor state indicators are a geometric outline (e.g., a circle, rectangle with rounded-corners, or the like). In some implementations, a precursor state indicator includes additional features such as a "glow" or "shimmer" or a "squinting" of the geometric shape. A precursor state indicator may include a visual cue mimicking a "focus ring" of a conventional camera.

Provided the object recognition model 116 positively identifies objects, then data is provided to the application 115 for an identification state of the object recognition model 116 that causes an identification state indicator to be displayed within the image (208). The identification state indicator is configured to visually emphasis to the user the candidate object as being positively identified object within the image. In some implementations, the identification state indicator is a geometric outline (e.g., a rectangle). The identification state indicator may include additional features to highlight or elucidate the identified object within the image (e.g., a color change, a "glow," or by greying out/ blurring the image outside of the identification state indicator).

In some implementations, the identified object is positively identified by the object recognition model 116 when a likelihood of the candidate object being the object meets a positive identification threshold.

In some implementations, latency is introduced into the object recognition model 116, such that the transition to subsequent object recognition states 118 of the object recognition model 116 is slowed down sufficiently for a user to visually understand the respective precursor state indicators displayed within the image on the user device 106. Moreover, by introducing latency into the object recognition model 116, a user may provide feedback to the object recognition model 116.

In some implementations, one or more features of a precursor state indicator cue the user to perform an action (e.g., make an adjustment to the image or the precursor state indicator in the application environment). In one example, a quality issue with the image may be indicated using one or more precursor state indicator cues, such that the object recognition model 116 assists the user to increase discoverability and improve the possibility of a positive identification of a candidate object. For example, a precursor state indicator may indicate that the image is blurry, e.g., by blurring the lines of the indicator, shaky, e.g., by shaking the lines of the indicator, and/or dark, e.g., by varying the opaqueness of the lines of the indicator, such that the object recognition model 116 cannot identify a candidate object. The user may then be prompted by the visual cue of the precursor state indicator to provide user feedback.

An example process 220 for providing user feedback to the object recognition model 116 is shown in flow diagram FIG. 2B. An indication of user-provided feedback is received by the application 115 during a particular object recognition state 118 of the object recognition model 116 (222). User-provided feedback may occur during various object recognition states 118 of the object recognition model 116, including a "loading" state, a "searching" state, a "seeing" state, and an "identification" state. The user-provided feedback may also occur during two of more of the object recognition states 118 (e.g., initial feedback received during the "searching" state, and additional feedback received during the "identifying" state).

User-provided feedback can take various forms, and different object recognition states 118 may have different forms of user-provided feedback options. For example, a user-provided feedback can include a selection, by a user, of a particular region of the image surrounding a candidate object or of a precursor state indicator (e.g., a "press-and-hold" of a particular geometric outline surrounding a candidate object). Another user-provided feedback can include a resizing of a precursor state indicator (e.g., shrinking a geometric outline surrounding a candidate object) and/or moving a precursor state indicator (e.g., moving the geometric outline to surround a different candidate object) within the image. Further examples of user-provided feedback is discussed in more detail with reference to FIGS. 4A-4C.

The user-provided feedback is then provided to the object recognition model 116 (224). Feedback may be provided to the object recognition model 116 in the form of identifying specific pixels in the image in which to search for a candidate object. The specific pixels may have been specified by the user by means of the user-provided feedback, e.g., by the user selecting and resizing or moving a specific indicator that is displayed during a specific state.

Feedback from a user may also indicate to the object recognition model 116 that there was a failure to identify an object of interest, and that one or more of the object recognition states 118 must be revisited. For example, suppose a user sees an object in an image that is not positively identified by the object detection model 116. The user may select an identification state indicator for an object that has been positively identified and move it to the object of interest to the user. The object recognition model 116 may then initiate with a focus on the area selected by the user.

The object recognition model 116 may then adjust the performance of the model for the particular object recognition state 118 for which the user-provided feedback was given (226). Adjustments of performance can include focusing the object recognition model 116 to a particular region (e.g., a set of pixels) of the image to look for candidate objects, selecting a particular candidate object from amongst multiple possible candidate objects as an object of interest, or similar performance adjustments that improve the positive identification of an object of interest.

In some implementations, a candidate object is identified based on the user-provided feedback (228). For example, a user may indicate through the user-provided feedback that the image contains one or more candidate objects by selecting a region including the candidate objects. In another example, an image may include multiple candidate objects, and a user-selected candidate object can be given priority in the object recognition model 116. User-provided feedback is discussed in further detail with reference to FIGS. 4A-4C.

Example Object Recognition State Indicator Display

FIGS. 3A-3F are illustrations of example visual indicators that are displayed during object recognition states. To better emphasize the indicators in the drawings, an example image 302 and user device are shown in phantom lines.

The image 302 depicting a woman is displayed in an application window 304 of the user device 306, as seen in FIG. 3A. The image 302 may be an image locally stored on the user device 306, a "live" capture image, or an image from a resource (e.g., resource 105) received through the network 102. The image 302 is processed to detect objects, as indicated in the following figures.

The first state of an object recognition model 116 is a loading state, and the loading state indicator is shown in FIG. 3B. An example precursor state indicator for the first precursor state includes a hash-pattern 308 superimposed over image 302, visually indicating to a user of the user device 306 that the image 304 is loading into the object recognition model 116. As described above, the application 115 receives the data describing the state of the object recognition model 116 and the area of interest. Because the loading process does not necessarily perform object detection, the entire area of the image is covered by the loading state indicator 308. Other indicators that do not cover the entire image may also be used, however.

Following a "loading" state, the object recognition model 116 proceeds to a precursor state (e.g., a "searching" state). As shown in FIG. 3C, example precursor state indicators for the "searching" state are shown. The example precursor state indicator for the second precursor state includes circular geometric outlines 310 within the image 302, visually indicating to the user that the object recognition model 116 is searching the highlighted regions for candidate objects. The precursor state indicators may include regions that include candidate objects (e.g., 310a), and may additionally include regions that do not include candidate objects (310b). In some implementations, the "searching" precursor state indicators highlight one or more edges of a candidate object, for example, the woman in image 302.

Precursor state indictors for a particular precursor state may appear and disappear in the display while the model is in a particular state. For example, FIG. 3C may depict the "searching" precursor states at any one time. At a later time, for example, precursor state indicator 310c may appear, and one or more of the other precursor state indicators may disappear. The appearance and disappearance of indicators is the result of the object recognition model 116 selecting and discarding particular regions, or subsets, of the images during the particular processing state.

FIG. 3D illustrate indicators 312 for a second precursor state, (e.g., a "seeing" state) of the object recognition model 116. The precursor state indicator for the second precursor state includes rounded-corner rectangular outlines 312 within the image 302, visually indicating to the user that the object recognition model is seeing potential candidate objects within the regions highlighted by the indicators. For example, "seeing" state indicator 312a highlights the woman's shoes, which "seeing" state indicator 312b highlights the woman's watch. The "seeing" state is achieved when the "searching" state has detected candidate objects within the image, but has not yet determined what the candidate objects are. The "seeing" state attempts to identify detected object for what they are, e.g., shoes, face, etc.

More generally, each precursor state generates a final output data set, and each subsequent precursor state is achieved when a previous precursor state generates the final output data set. For example, once the "searching" precursor state has processed the entire image 302 and has determined that all candidate objects have been identified, the final output data set for the "searching" state is generated by the object recognition model 116. The object recognition model 116 then transistors to the "seeing" state, which uses the final output data set for the "searching" state as input.

Figure 3F:
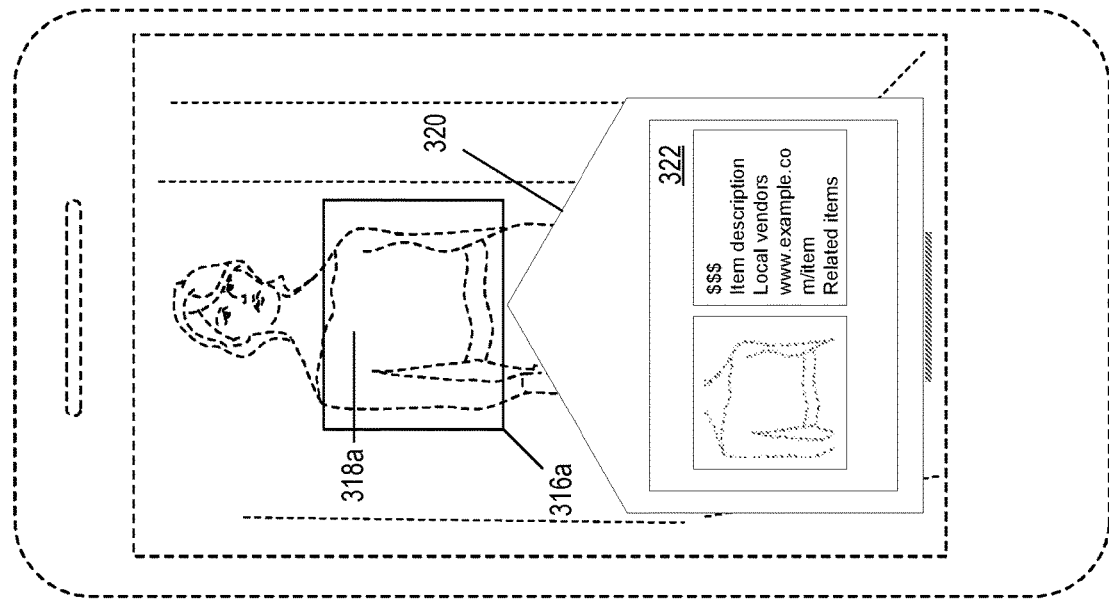
Figure 3E:
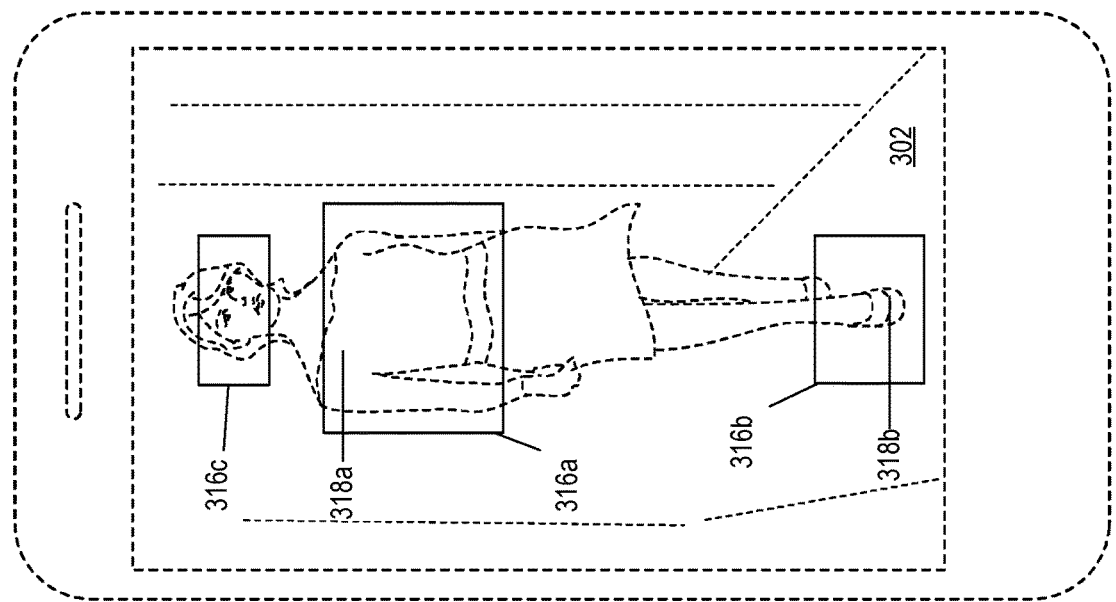

After the precursor states of the object recognition model 116 are complete, the object recognition model 116 proceeds to an identification state (e.g., a "recognizing" or "identifying" state), the indicators of which are illustrated in FIG. 3E. An identification state indicator for the identification state includes one or more rectangle outlines 316 within the image 302, visually indicating to the user that the object recognition model 116 has positively identified one or more objects 318 from the candidate objects within the image 302. For example, objects identified in image 302 may include an object (e.g., a blouse) 318a identified by identification state indicator 316a and an object (e.g., a pair of shoes) 318b identified by identification state indicator 316b. Additionally, identification state indicator 316c indicates a positive identification of a face of the woman in image 302.

As illustrated in FIGS. 3A-3F, each state indicator for a particular state is different from each state indicator for each other state. The uniqueness of the state indicator for a particular state provides a visual cue to the user regarding the current state of the object recognition model 116.

In some implementations, positively identified objects within the image 302 may be associated with triggers for further actions by the application 115. FIG. 3F shows an example interface in which a search has been invoked on search engine 108 based on an identified object (e.g., object 318a) positively identified by the object recognition model 116. The search may be invoked, for example, by the user selecting the identification state indicator 316a, e.g., by a gesture or press on the display portion on which the indicator 318a is displayed. Additional information may be displayed in a window 320 within the application environment, including a search results page 320. The search results page 320 can include information about the identified object 318a, for example, a price for purchase, an item description, related websites to the identified object 318a, and/or additional related items.

Other forms of disambiguation are possible when conducting a search query using the positively identified objects within an image. For example, a search query can be input by a user (e.g., a text string), or through an assistant (e.g., through a voice command). The positively identified objects within the image 302 can be used in combination with a search query. For example, the positively identified object 318a (e.g., a blouse) by the object recognition model 116 can be combined with a user input (e.g., a text string or spoken command) to further disambiguate a query in relation to the object 318. Examples of the user input can include "what is that fabric?" "who sells this?" or "how do you wash this?" where the query can be a partial or ambiguous query and is disambiguated using the identified object and/or image data for the identified object.

In some implementations, a positively identified person within the image 302 may trigger a display of information about the positively identified person (e.g., a knowledge card for the identified person or related images also including the positively identified person).

Example User Feedback for Object Recognition Model

Figure 4C:
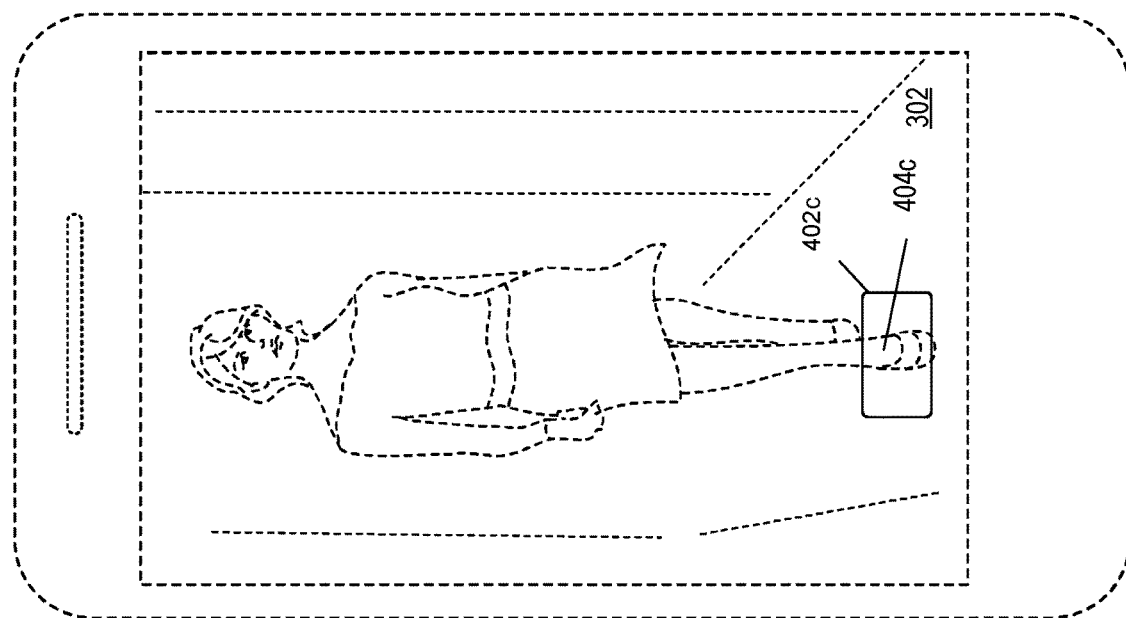

In some implementations, a user may provide feedback to the object recognition model 116 by use of the state indicators. FIGS. 4A-4C illustrate state indicators that are manipulated to provide feedback during the object recognition process. As described with reference to FIG. 2B, user-provided feedback may take place during any of the object recognition states 118 of the object recognition model 116. For example, as shown in FIGS. 4A-4C, user feedback can be provided to the object recognition model 116 during a "seeing" precursor state of the objection recognition states 118.

FIG. 4A shows the image 302, where a seeing state indicator 402 is highlighting a region within the image 302. The seeing state indicator 402 may include a geometric outline (e.g., a rounded-corner rectangle) and other additional features such as a shading within the outline, as shown in FIG. 4A. The seeing state indicator 402 is shown in FIG. 4A to include multiple candidate objects including a skirt 404a and a watch 404b. Additionally, the seeing state indicator 402 can include a visual cue to the user in the form of a resizing arrow 406. Resizing arrow 406 may cue the user of a functionality to optionally alter the dimensions and/or location of the seeing state indicator 402.

In some implementations, a user-provided feedback includes a user resizing a seeing state indicator 402a such that the resized seeing state indicator 402b highlights the candidate object 404b. For example, as shown in FIG. 4B, the user may distinguish a candidate object of interest over other candidate objects identified by the object recognition model 116. The user may resize or move a particular indicator when the object recognition model 116 does not appear to be detecting an object that may be of particular interest to the user. Once the indicator is adjusted by the user, the object recognition model 116 re-initiates the particular state using, as input, the data corresponding to the resized state indicator.

In some implementations, a user-provided feedback includes a user selection of a region within the image 302 (e.g., seeing state indicator 402c) that highlights a candidate object not previously detected by the object recognition model 116. The user selection may be in the form of a "long press" by the user over the region of the image containing the candidate object. For example, in FIG. 4C, the user may choose to select the candidate object 404c (e.g., the woman's shoes) as the object of interest during the "seeing" precursor state of the object recognition model 116. The user selection of candidate object 404c may then be provided to the object recognition model 116, which can proceed to another object recognition state 118 of the object recognition model 116.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    providing an image for display in an application environment of an application executing on a user device;
    performing object recognition on the image by use of an object recognition model that has a plurality of object recognition states, where at least one object recognition state is an identification state that is achieved when a candidate object detected in the image is positively identified by the model as an object in the image, and at least one or more states are precursor states to the identification state, and each of the identification state and the one or more precursor states are indicated by a respective identification state indicator and respective precursor state indicators;
    providing, to the application executing on the user device, data that causes each of the precursor state indicators to be displayed within the image in the application environment to visually emphasize the candidate object and to indicate the respective precursor state of the object recognition model and the identification state indicator to be displayed within the image to visually emphasize the candidate object as being positively identified and to indicate the identification state of the object recognition model;
    in response to the candidate object being positively identified and indicated by a display of the identification state indictor over the candidate object, enabling selection of the identification state indicator by the user to trigger further search actions.

2. The computer-implemented method of claim 1, wherein enabling selection of the identification state indicator by the user to trigger further search actions comprises:
    enabling a touch selection of the state indicator; and
    in response to a touch selection of the state indicator, enabling a search query input by the user.

3. The computer-implemented method of claim 2, further comprising:
    receiving a search query input by the user in response to the enabling of the search query input;
    combining an identification of the identified object with the search query input to form a combined user search query input;
    providing the combined search query input to a search system; and
    receiving and displaying search results responsive to the combined search query input from the search system.

4. The computer-implemented method of claim 3, wherein combining the identification of the identified object with the search query input to form a combined user search query input comprises disambiguating the search query input by the identification of the identified object.

5. The computer implemented method of claim 3, wherein the search query input is provided to an assistant executing on a user device.

6. The computer-implemented method of claim 1, wherein enabling selection of the identification state indicator by the user to trigger further search actions comprises:
    enabling a touch selection of the state indicator; and
    in response to a touch selection of the state indicator, providing information about the identified object within the application environment.

7. A system comprising:
    a data processing apparatus; and
    a non-transitory computer readable medium storing instructions executable by the data processing apparatus and thus upon such execution cause the data processing apparatus to perform operations comprising:
    providing an image for display in an application environment of an application executing on a user device;
    performing object recognition on the image by use of an object recognition model that has a plurality of object recognition states, where at least one object recognition state is an identification state that is achieved when a candidate object detected in the image is positively identified by the model as an object in the image, and at least one or more states are precursor states to the identification state, and each of the identification state and the one or more precursor states are indicated by a respective identification state indicator and respective precursor state indicators;
    providing, to the application executing on the user device, data that causes each of the precursor state indicators to be displayed within the image in the application environment to visually emphasize the candidate object and to indicate the respective precursor state of the object recognition model and the identification state indicator to be displayed within the image to visually emphasize the candidate object as being positively identified and to indicate the identification state of the object recognition model;

in response to the candidate object being positively identified and indicated by a display of the identification state indictor over the candidate object, enabling selection of the identification state indicator by the user to trigger further search actions.

8. The system of claim 7, wherein enabling selection of the identification state indicator by the user to trigger further search actions comprises:

enabling a touch selection of the state indicator; and in response to a touch selection of the state indicator, enabling a search query input by the user.

9. The system of claim 8, further comprising:

receiving a search query input by the user in response to the enabling of the search query input;

combining an identification of the identified object with the search query input to form a combined user search query input;

providing the combined search query input to a search system; and receiving and displaying search results responsive to the combined search query input from the search system.

10. The system of claim 9, wherein combining the identification of the identified object with the search query input to form a combined user search query input comprises disambiguating the search query input by the identification of the identified object.

11. The system of claim 9, wherein the search query input is provided to an assistant executing on a user device.

12. The system of claim 7, wherein enabling selection of the identification state indicator by the user to trigger further search actions comprises:

enabling a touch selection of the state indicator; and in response to a touch selection of the state indicator, providing information about the identified object within the application environment.

13. A non-transitory computer storage medium storing instructions executable by a data processing apparatus and that upon such execution cause the one or more server computers to perform operations comprising:

providing an image for display in an application environment of an application executing on a user device;

performing object recognition on the image by use of an object recognition model that has a plurality of object recognition states, where at least one object recognition state is an identification state that is achieved when a candidate object detected in the image is positively identified by the model as an object in the image, and at least one or more states are precursor states to the identification state, and each of the identification state and the one or more precursor states are indicated by a respective identification state indicator and respective precursor state indicators;

providing, to the application executing on the user device, data that causes each of the precursor state indicators to be displayed within the image in the application environment to visually emphasize the candidate object and to indicate the respective precursor state of the object recognition model and the identification state indicator to be displayed within the image to visually emphasize the candidate object as being positively identified and to indicate the identification state of the object recognition model;

in response to the candidate object being positively identified and indicated by a display of the identification state indictor over the candidate object, enabling selection of the identification state indicator by the user to trigger further search actions.

* * * * *

UNITED STATES PATENT AND TRADEMARK OFFICE
CERTIFICATE OF CORRECTION

PATENT NO. : 10,685,256 B2  
APPLICATION NO. : 16/387224  
DATED : June 16, 2020  
INVENTOR(S) : Barnett et al.

Page 1 of 1

It is certified that error appears in the above-identified patent and that said Letters Patent is hereby corrected as shown below:

In the Specification

Column 5, Line 24, after the word "state", please delete "indictor" and insert the word --indicator--

Column 8, Line 46, after the word "state", please delete "indictors" and insert the word --indicators--

Column 14, Line 11, after the word "state", please delete "indictor" and insert the word --indicator--

In the Claims

Column 15, Line 10, after the word "state", please delete "indictor" and insert the word --indicator--

Column 16, Line 34, after the word "state", please delete "indictor" and insert the word --indicator--

Signed and Sealed this  
Eleventh Day of August, 2020

Andrei Iancu  
*Director of the United States Patent and Trademark Office*